United States Patent [19]

Hewlett

[11] Patent Number: 5,426,576
[45] Date of Patent: Jun. 20, 1995

[54] COLOUR CROSS-FADING SYSTEM FOR A LUMINAIRE

[75] Inventor: William E. Hewlett, Pasadena, Calif.

[73] Assignee: Light & Sound Design, Limited, Edinburgh, Scotland

[21] Appl. No.: 51,373

[22] Filed: Apr. 23, 1993

[51] Int. Cl.⁶ ................................................ F21V 9/00
[52] U.S. Cl. ..................... 362/293; 362/268; 362/283; 359/889; 359/890
[58] Field of Search ............... 362/268, 281, 282, 283, 362/293, 284; 359/889, 890

[56] References Cited

U.S. PATENT DOCUMENTS

| 4,602,321 | 7/1986 | Bornhorst | 362/268 |
| 4,800,474 | 1/1989 | Bornhorst | 362/293 |
| 4,984,143 | 1/1991 | Richardson | 359/889 |
| 5,111,343 | 5/1992 | Harrigan | 359/888 |
| 5,126,886 | 6/1992 | Richardson et al. | 359/889 |

FOREIGN PATENT DOCUMENTS

WOA911192-13 12/1991 WIPO .

Primary Examiner—Ira S. Lazarus
Assistant Examiner—Alan B. Cariaso
Attorney, Agent, or Firm—Fish & Richardson

[57] ABSTRACT

A color cross-fading system for a luminaire includes two filter disks or strips each provided with a multi-layer filter coating to provide a dichroic filter effect. In each case the thickness of the coating layers varies continuous along a gradient axis of the filter disk or strips. One disk acts predominantly as a long wave pass filter and the other act predominantly as a short wave pass filter, but each disk has an essentially "complex" characteristic enabling a very wide range of different colors to be obtained by cumulative subtractive filtering, by varying the positions of the two disks or strips relative to an optical axis.

29 Claims, 4 Drawing Sheets

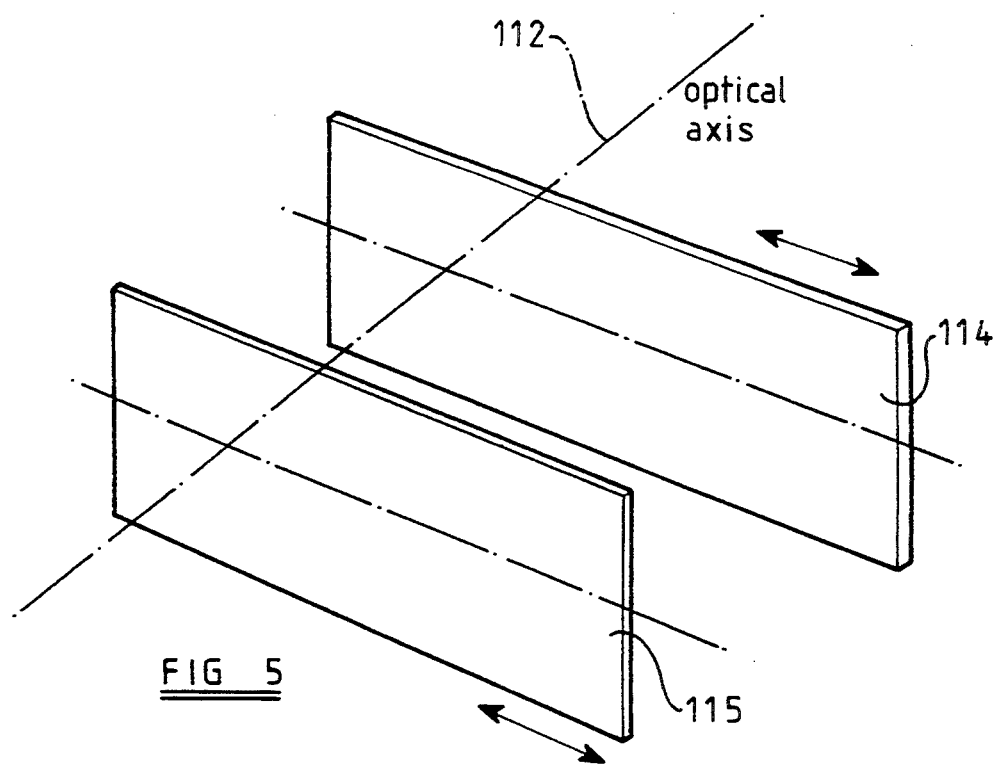
FIG 5
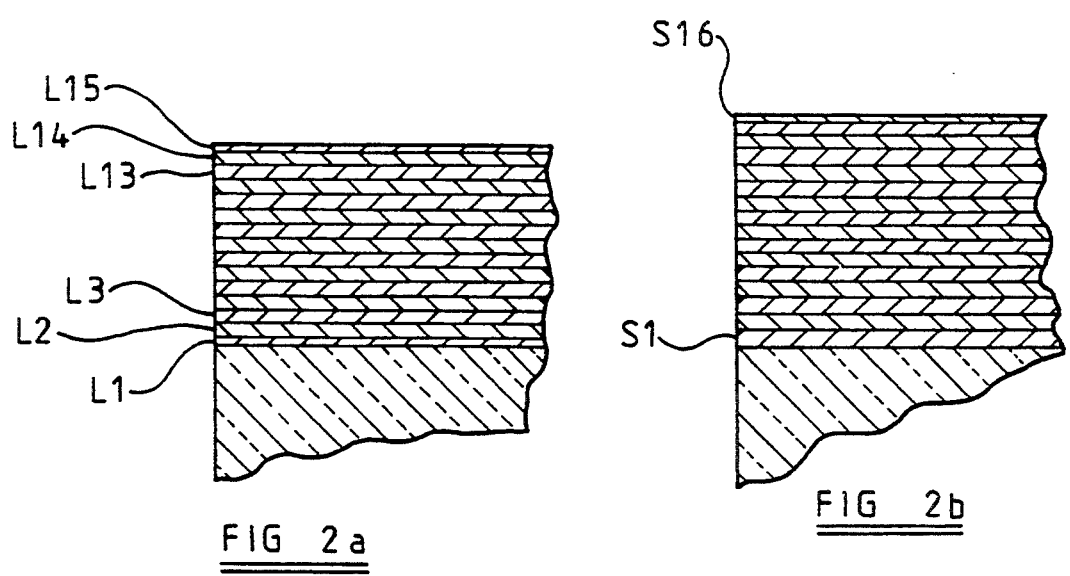
FIG 2a
FIG 2b

COLOUR CROSS-FADING SYSTEM FOR A LUMINAIRE

This invention relates to a colour cross-fading system for a luminaire for use in stage, architectural or other lighting applications.

Various proposals have already been made for providing variation of the colour of light produced by luminaires, the earliest of such proposals being the use of coloured gels across the light beam. Colour changers employing gels have had multiple gels in a rotary carrier which can be turned to position any one of a plurality of differently coloured gels in the beam, or strings of square colour gels connected together edge to edge and scrollable across the beam between a pair of rollers.

U.S. Pat. Nos. 4,459,014 (Thebault 7/84) and 4,600,976 (Callahan 7/86) both utilize three uniform density primary or secondary colour filters which can be moved individually to intercept a variable proportion of the beam cross-section. Whilst this arrangement enables a wide range of overall average colours to be obtained, the distribution of colours within the beam is non-uniform and proper mixing can only be achieved by diffusion which is inefficient. U.S. Pat. Nos. 4,897,770 (Solomon 1/90) and its continuation 4,958,265 (9/90) improve the distribution by providing for the colour filters to affect opposite sides of the beam simultaneously so that the beam colour distribution is symmetrical, but still non-uniform. The above-mentioned prior patents all rely on additive mixing of different parts of a beam and U.S. Pat. No. 5,044,730 (La Duke 9/91) also relies on such mixing using filters which split the beam into differently coloured subsidiary beams and a mixer for recombining the subsidiary beams.

U.S. Pat. No. 4,914,556 (Richardson 4/90) makes use of filter plates having a filter coating applied in a pattern the density of which varies. A preferred embodiment uses three such plates in yellow, cyan and magenta. This arrangement again allows wide variation of colour in a continuous manner, but the beam is striated especially when the luminaire's focusing system is focused on or near one of the plates.

U.S. Pat. No. 4,392,187 (Bornhorst 7/83) discloses two techniques for varying the transmitted beam colour. In one technique several dichroic filters are pivotally mounted in the light beam so that variation of hue can be obtained by pivoting the filters about axes perpendicular to the beam axis. This arrangement still requires a mixer or integration lens to mix white light with the variably coloured light transmitted by the filters. The other technique uses two rotatable disks having a plurality of dichroic filters on each. The disks are indexed individual so that different combinations of filters are positioned across the beam, so that the effects of the two filters across the beam are cumulative. The former technique is also used in U.S. Pat. No. 4,602,321 (Bornhorst 7/86) whilst the latter technique is developed in U.S. Pat. No. 4,800,474 (Bornhorst 1/89) in which the dichroic filters on one disk are long band pass filters having different cut-off wavelengths and those on the other disk are short band pass filters having different cut-off points. This latter patent also discloses the use of so called "complex" filters, which are basically band stop filters with the whole stop band within the visible range. These are utilised in combination with long band pass filters or short band pass filters to obtain additional colours not available by simple long and short band pass filtering.

In none of the above mentioned patents is it possible to obtain continuous variation of colour over the entire visible range by simple cumulative subtractive filtration. In every case colours are changed stepwise or, where some continuous variation is available, this is over a limited range and re-mixing or diffusion is required to obtain a uniform beam.

It is an object of the present invention to provide a full range colour cross-fading system for a luminaire in which continuous variation of colour can be obtained in a simple and efficient manner without remixing or diffusion of the beam.

It is a further object of the invention to provide such a cross-fading system in which "complex" filter characteristics can be obtained and varied continuously.

Broadly, the invention resides in a colour cross-fading system for a luminaire which comprises first and second filter elements each comprising a substrate having thereon a plurality of layers of materials having different refractive indices, the thickness of such layers decreasing continuously along a gradient axis of each filter element, said first filter element having a predominantly long wave pass characteristic such that at each point along said gradient axis visible light waves with wavelengths longer than a first cut-off wavelength are passed, said first cut-off wavelength varying continuously along said gradient axis, said second filter element having a predominantly short wave pass characteristic such that at each point along said gradient axis visible light waves with wavelengths shorter than a second cut-off wavelength are passed, said second cut-off wavelength varying continuously along said gradient axis, and transport means mounting said first and second filter elements for movement independently of one another relative to an optical axis, whereby any point on the gradient axis of each filter element can be independently brought into alignment with the optical axis.

For convenience of manufacture of the filter elements the thicknesses of the plural layers thereon at each point along the gradient axis are linearly related to the displacement of such point from a reference point on the gradient axis. This results in the cut-off wavelength at each point being linearly related to the displacement.

Preferably, each of the filter elements has a "complex" filter characteristic. In the case of the long wave pass filter element substantially all the light of wavelength longer than said first cut-off wavelength is passed, but in addition, a smaller proportion of light of wavelength shorter than a cut-off limit lower than said first cut-off wavelength is also transmitted. Similarly, in the case of the short wave pass filter element a proportion of light of wavelength longer than a cut-off limit higher than the second cut-off wavelength is passed.

Where, as is preferable, the thicknesses of the various layers of the filter elements remain in the same proportions to one another along the length of the gradient axis, the cut-off limits referred to above are proportional to the cut-off wavelengths.

Furthermore, in the case of the short-wave pass filter, there may be a lower wavelength at which light begins to pass ("cut-on wavelength") (within the visible range) below which no light can pass. Again, where the thicknesses of the layers remain in the same proportions to one another along the gradient axis this lower cut-on wavelength is proportion to the cut-off wavelength.

It will be appreciated by those skilled in the art of dichroic filter design that the lower cut-off wavelength and the two cut-off limits referred to may, when the cut-off wavelength is close to an end of the visible range, be outside the visible light range and hence not relevant to the use of the filter elements for light beam colour variation.

Preferably, the ratio of the cut-off wavelength to the cut-off limit is in the range of from 1:0.70 to 1:0.85 for the long wave pass filter element. In the case of the short wave pass filter the ratio of the cut-off wavelength to the cut-off limit is in the range of from 1:1.27 to 1:1.40. The ratio of the cut-off wavelength to the cut-on wavelength of the short wave pass filter is in the range of from 1:0.40 to 1:0.50.

Figure 1:
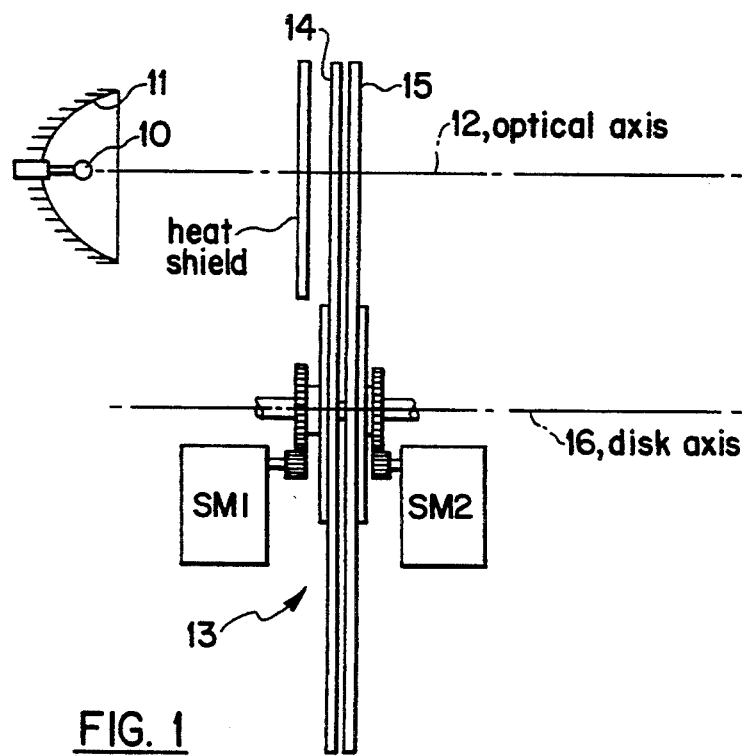
FIG. 1 is a diagrammatic view of one example of a colour cross-fading system in accordance with the invention.
Figure 2:
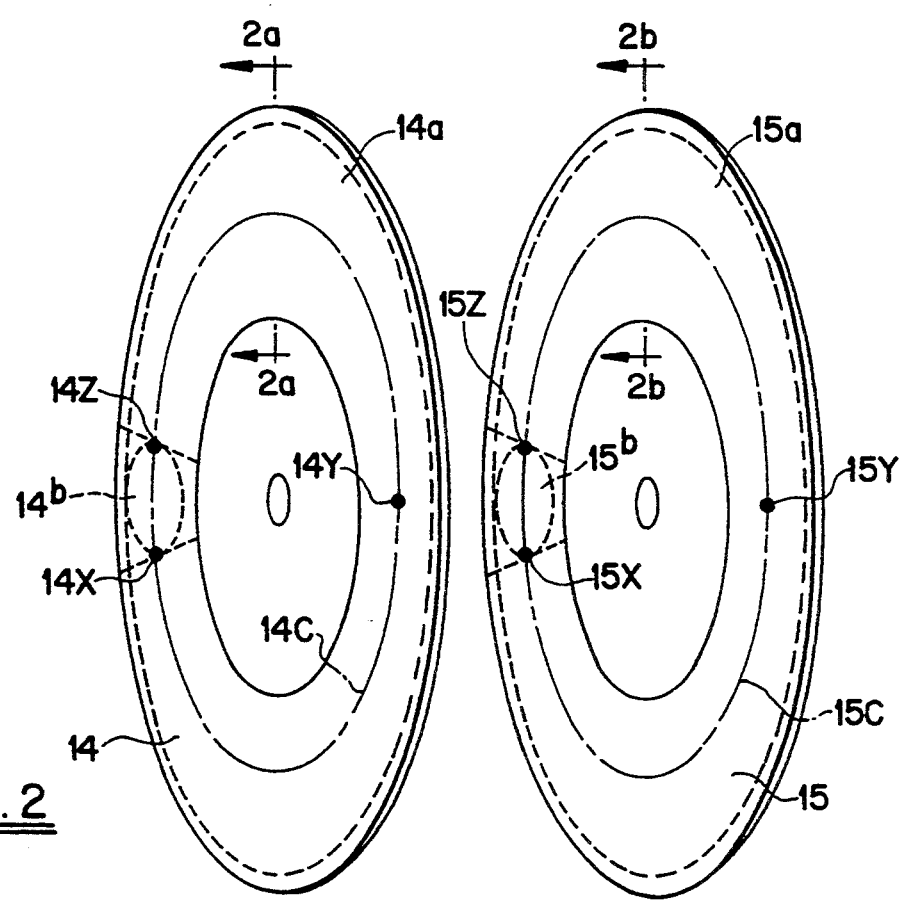
FIG. 2 is a diagrammatic perspective view of two filter disk elements included in the example shown in FIG. 1.
Figure 3:
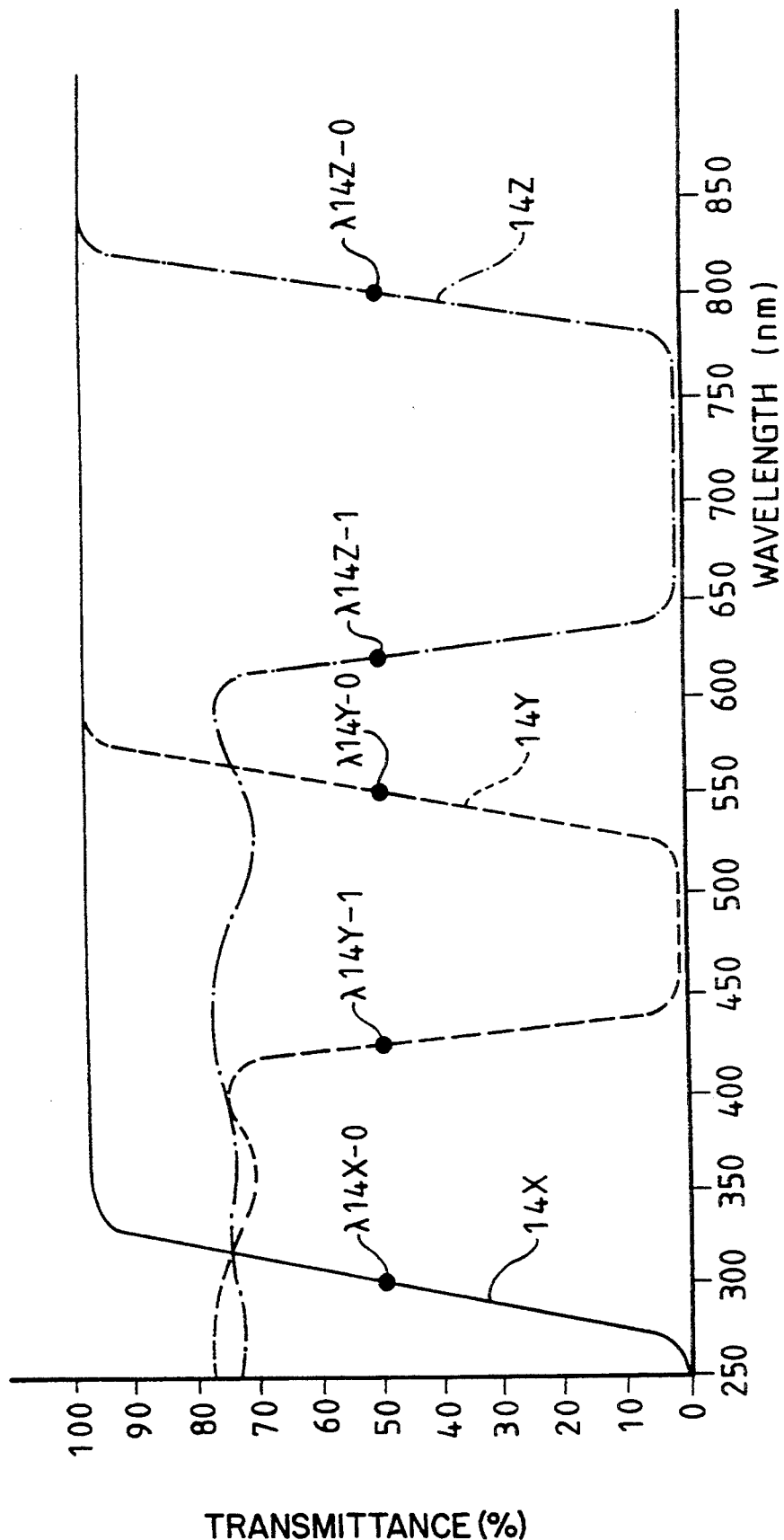
Figure 4:
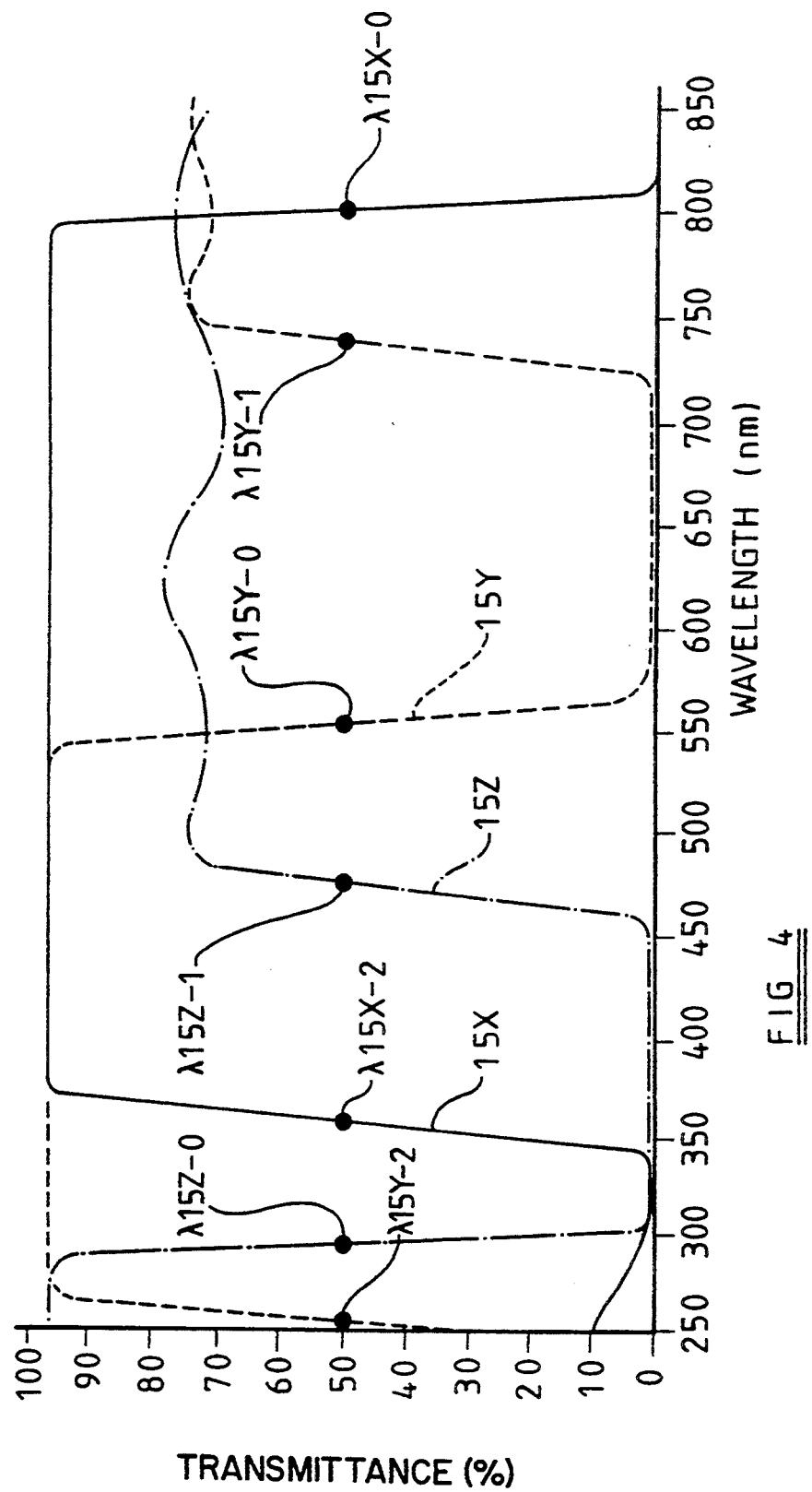

FIGS. 2a and 2b are enlarged fragmentary sections taken respectively on lines 2a—2a and 2b—2b in FIG. 2;

FIGS. 3 and 4 are graphs showing the filter characteristics of the two disks shown in FIG. 1; and FIG. 5 is a diagrammatic perspective view of another example of the invention.

Referring firstly to FIG. 1 a light source 10 with an ellipsoidal reflector 11 projects a white light beam along an optical axis 12. For varying the colour of the light beam there is provided a colour cross-fading system 13 which includes first and second disk shaped filter elements 14 and 15 which are optically in series with one another. These disks are rotatably mounted for turning about a common axis 16 and each is provided with a servo-motor drive SM1, SM2 for rotating it independently of the other. The disk axis 16 is spaced from and parallel to the optical axis 13 and the two disks intersect the optical axis. Arrangements of multiple filter disks of this kind are well known in the prior art and found, for example, U.S. Pat. No. 4,800,474 the disclosure of which is hereby incorporated by reference.

As shown in FIG. 2 the two disks 14, 15 are formed of a transparent substrate of ceramic, glass, quartz, plastic or other material and each has a substantially annular area 14a, 15a coated with dielectric materials to provide a dichroic filter effect having a required filter characteristic. In each case there is an uncoated sector 14b, 15b of width sufficient to pass the beam from the lamp. For maximum unfiltered light transmission a beam-section sized hole may be cut in the substrate in this sector.

The thickness of the layers of coating material varies along a gradient axis 14c, 15c, which in the present example is a circular line following the locus of the intersection of the optical axis and the disk when the latter is rotated about its own axis. In each case there is a linear relationship between the thickness of each of the coating layers at a given point and the displacement of that point along the gradient axis from a reference point (the centre of the notional beam-section circle in the uncoated sector).

The two disks act predominantly as long wave pass and short wave pass filters respectively, but each has a specific "complex" characteristic. The cut-off wavelength of the predominating long or short wave pass characteristic at each point on the gradient axis is proportional to the coating thickness and hence is linearly related to the displacement of that point along the gradient axis from the reference point.

In a specific example of the invention, both filters are coated with alternating layers of titanium dioxide and silicon dioxide, the latter having the lower refractive index. In the case of the long wave pass filter 14 there are fifteen layers $L_1$ to $L_{15}$ (see FIG. 2a) with titanium dioxide directly applied to the substrate and as the top layer. The layers are applied one by one by well-known thin film vacuum deposition techniques, by rotating the disk in a vacuum deposition chamber whilst controlling the opening of a variable shutter or mask which controls the rate at which evaporated material to be deposited can approach the substrate. The opening of the masked is controlled in synchronism with rotation of the disk to provide (within the available tolerances) a linear relationship between the thickness of each layer and the angular displacement of the disk from a reference position. Table 1, below gives the design thicknesses of the various layers at the points 15X, 15Y and 15Z shown in FIG. 2. The "ratio" column shows the ratio of the desired cut-off wavelength at each point and the thickness of each layer. The cut-off wavelength is designed to 300 nm at point 14X, 550 nm at point 14Y and 800 nm at point 14Z.

TABLE 1

Long Wave Pass Filter

| LAYER | MATERIAL | RATIO | 14X (nm) | 14Y (nm) | 14Z (nm) |
|---|---|---|---|---|---|
| $L_1$ | $TiO_2$ | 0.52 | 156 | 286 | 416 |
| $L_2$ | $SiO_2$ | 0.93 | 279 | 511 | 744 |
| $L_3$ | $TiO_2$ | 0.95 | 285 | 522 | 760 |
| $L_4$ | $SiO_2$ | 1.00 | 300 | 550 | 800 |
| $L_5$ | $TiO_2$ | 1.00 | 300 | 550 | 800 |
| $L_6$ | $SiO_2$ | 1.00 | 300 | 550 | 800 |
| $L_7$ | $TiO_2$ | 1.00 | 300 | 550 | 800 |
| $L_8$ | $SiO_2$ | 1.00 | 300 | 550 | 800 |
| $L_9$ | $TiO_2$ | 1.00 | 300 | 550 | 800 |
| $L_{10}$ | $SiO_2$ | 1.00 | 300 | 550 | 800 |
| $L_{11}$ | $TiO_2$ | 1.00 | 300 | 550 | 800 |
| $L_{12}$ | $SiO_2$ | 1.00 | 300 | 550 | 800 |
| $L_{13}$ | $TiO_2$ | 1.00 | 300 | 550 | 800 |
| $L_{14}$ | $SiO_2$ | 1.15 | 445 | 632 | 920 |
| $L_{15}$ | $TiO_2$ | 0.40 | 120 | 220 | 320 |

In the case of the short wave pass filter 15 there are sixteen layers $S_1$ to $S_{16}$, the first layer $S_1$ being of titanium dioxide and the sixteenth being of silicon dioxide. Table 2 below shows the design thicknesses to give cut-off wavelengths of 300 nm, 550 nm and 80 nm at points 15X, 15Y and 15Z respectively.

TABLE 2

Short Wave Pass Filter

| LAYER | MATERIAL | RATIO | AT 15X | AT 15Y | AT 15Z |
|---|---|---|---|---|---|
| $S_1$ | $TiO_2$ | 1.17 | 936 | 643 | 351 |
| $S_2$ | $SiO_2$ | 1.11 | 888 | 610 | 333 |
| $S_3$ | $TiO_2$ | 1.00 | 800 | 550 | 300 |
| $S_4$ | $SiO_2$ | 1.00 | 800 | 550 | 300 |
| $S_5$ | $TiO_2$ | 1.00 | 800 | 550 | 300 |
| $S_6$ | $SiO_2$ | 1.00 | 800 | 550 | 300 |
| $S_7$ | $TiO_2$ | 1.00 | 800 | 550 | 300 |
| $S_8$ | $SiO_2$ | 1.00 | 800 | 550 | 300 |
| $S_9$ | $TiO_2$ | 1.00 | 800 | 550 | 300 |
| $S_{10}$ | $SiO_2$ | 1.00 | 800 | 550 | 300 |
| $S_{11}$ | $TiO_2$ | 1.00 | 800 | 550 | 300 |
| $S_{12}$ | $SiO_2$ | 1.00 | 800 | 550 | 300 |

TABLE 2-continued

Short Wave Pass Filter

| LAYER | MATERIAL | RATIO | THICKNESS AT 15X | AT 15Y | AT 15Z |
|---|---|---|---|---|---|
| $S_{13}$ | $TiO_2$ | 1.00 | 800 | 550 | 300 |
| $S_{14}$ | $SiO_2$ | 1.103 | 882 | 607 | 331 |
| $S_{15}$ | $TiO_2$ | 0.987 | 790 | 543 | 296 |
| $S_{16}$ | $SiO_2$ | 0.535 | 428 | 294 | 161 |

FIGS. 3 and 4 show approximate sample filter characteristics for the two disks, at selected labelled points on the disks. FIG. 3 shows the characteristics of the long wave pass filter 14. The solid line in FIG. 3 shows the characteristics at the point 14X where the cut-off wavelength $\lambda_{14X\text{-}0}$ is about 300 nm. The dashed line in FIG. 3 shows the characteristics at point 14Y where the cut-off wavelength $\lambda_{14Y\text{-}0}$ is about 550 nm and the chain dotted line shows the characteristics at the point 14Z where the cut-off wavelength $\lambda_{14Z\text{-}0}$ is about 800 nm. Since the ratios of thickness of the various layers are constant along the axis 14c, each characteristic is similar to the others. If FIG. 3 had a log wavelength scale instead of the linear one shown, each characteristic curve would have exactly the same shape, but lie at a different position along the scale. There is a lower cut-off limit in the cases of points 14Y and 14Z, such limits being indicated in FIG. 3 as $\lambda_{14Y\text{-}1}$ and $\lambda_{14Z\text{-}1}$. The point $\lambda_{14X\text{-}1}$ also exists but is below the visible light wavelength range. For light of wavelength below the lower cut-off limit $\lambda_{14Y\text{-}1}$ or $\lambda_{14Z\text{-}1}$, the transmittance increases on average to about 75%, but varies with wavelength.

In the case of the short wave pass filter characteristics shown in FIG. 4, the cut-off wavelengths at the three points 15X, 15Y and 15Z are shown as $\lambda_{15X\text{-}0}$, $\lambda_{15Y\text{-}0}$ and $\lambda_{15Z\text{-}0}$. In the case of points 15Y and 15Z, there is a cut-off limit shown as $\lambda_{15Y\text{-}1}$ and $\lambda_{15Z\text{-}1}$ above which there is an average transmittance of about 75% varying with wavelength. The corresponding point $\lambda_{15X\text{-}1}$ also exists but is higher than the visible light wavelength range. Also shown in FIG. 4 are cut-on wavelengths $\lambda_{15X\text{-}2}$ and $\lambda_{15Y\text{-}2}$, which are wavelengths below which light transmission is cut-off at points 15X and 15Y respectively. A similar point $\lambda_{15Z\text{-}2}$ also exists but is below the visible light wavelength range.

Desirably, for the long wave pass filter the cut-off limit should be about 0.77 of the cut-off wavelength. For the short wave pass filter the cut-off limit should be about 1.34 times the cut-off wavelength and the cut-on wavelength should be about 0.45 of the cut-off wavelength.

With the arrangement described above, a very wide variety of colours can be obtained by selective positioning of the two filter disks. Moreover continuous slow cross fades from one colour to another can readily be achieved. For example a range of magenta shades can be obtained by adjusting disk 14 so that the optical axis 12 passes through a point on the disk 14 where the cut-off wavelength is about 650 nm and positioning the disk 15 so that the axis 12 passes through a point on disk 15 where the cut-off wavelength is about 500 nm. In these positions disk 14 will pass a red/blue mixture with a predominance of red light and disk 15 will pass a red/blue mixture with a predominance of blue light, but since filtration is cumulative, the combination of the two filters will pass balanced red/blue mixture. By turning disk 15 to increase its cut-off wavelength, the colour passed changes smoothly towards blue. Similarly by turning disk 14 to decrease its cut-off wavelength, the colour passed changes smoothly towards red.

FIG. 5 shows an alternative form of the invention in which the filters are in the form of elongated rectangular strips 114, 115 on which filter coatings are provided. These strips may be flexible to allow scrolling of the strips on rollers. The gradient axes are parallel straight lines intersecting the optical axis 112. The filters are mounted on linear bearings and are independently moveable longitudinally by linear servo motors (not shown). The characteristics of various points on the FIG. 5 embodiment would be similar to those in the FIG. 2 embodiment.

Although only a few embodiments of the invention have been described in detail above, those of ordinary skill in the art will understand that many modifications are possible in these embodiments without departing from the novel teachings thereof. For example, although silicon dioxide and titanium dioxide are preferred, other materials having similar characteristics such as Tantalum Pentoxide or Zirconium Dioxide could be employed. While only two specific filter shapes have been described, other filter shapes could of course be used so long as it is possible to vary the optical axis of one relative to the other. Furthermore, the number and relative thicknesses of the layers on each filter element could be varied to provide a range of different acceptable filter characteristics.

We claim:

1. A color cross-fading system for a luminaire which comprises first and second filter elements each comprising a substrate having thereon a plurality of layers of materials having different refractive indices, thickness of such layers varying continuously along a gradient axis of each filter element, said first filter element having a predominantly long wave pass characteristic such that at each point along said gradient axis visible light waves with wavelengths longer than a first cut-off wavelength are passed, said first cut-off wavelength proportional to said thickness of layers, which varies continuously along said gradient axis, said second filter element having a predominantly short wave pass characteristic such that at each point along said gradient axis visible light waves with wavelengths shorter than a second cut-off wavelength are passed, said second cut-off wavelength proportional to said thickness of layers, which varies continuously along said gradient axis, and means for mounting said first and second filter elements for movement independently of one another relative to an optical axis, whereby any point on the gradient axis of each filter element can be independently brought into alignment with the optical axis.

2. A color cross-fading system as claimed in claim 1 in which the thickness of the layers on each of said filter elements at each point along a gradient axis are linearly related to a displacement of such point from a reference point on said gradient axis.

3. A color cross-fading system as claimed in claim 1 in which the first filter element has a complex filter characteristic such that at each point on said gradient axis there is a cut-off limit at a wavelength lower than the corresponding cut-off wavelength.

4. A color cross-fading system as claimed in claim 3 in which the cut-off limit is at a substantially fixed proportion of the cut-off wavelength throughout the range of cut-off wavelengths, the cut-off limits corresponding to cut-off wavelengths at the lower end of the range being below the visible light wavelength range.

5. A color cross-fading system as claimed in claim 4 in which the ratio of the cut-off wavelength to the cut-off limit is in the range of from 1:0.70 to 1:0.85.

6. A color cross-fading system as claimed in claim 5 in which the ratio of the cut-off wavelength to the cut-off limit is 1:0.77.

7. A color cross-fading system as claimed in claim 1 or claim 3 in which the second filter element has a complex filter characteristic such that at each point on said gradient axis there is a cut-off limit at a wavelength higher than the corresponding cut-off wavelength.

8. A color cross-fading system as claimed in claim 7 in which the second filter cut-off limit is at a substantially fixed proportion of the second filter cut-off wavelength throughout the range of cut-off wavelengths, the second filter cut-off limits corresponding to second filter cut-off wavelengths at the upper end of the range being above the visible light wavelength range.

9. A color cross-fading system as claimed in claim 8 in which the ratio of the second filter cut-off wavelength to the second filter cut-off limit is in the range of from 1:1.27 to 1:1.40.

10. A color cross-fading system as claimed in claim 9 in which said ratio is 1:1.34.

11. A color cross-fading system as claimed in claim 7 in which the second filter element filter characteristic is such that at each point on said gradient axis there is a cut-on wavelength shorter than said second filter cut-off wavelength such that light at a wavelength below said cut-on wavelength is blocked.

12. A color cross-fading system as claimed in claim 11 in which said cut-on wavelength is at a substantially fixed proportion of said second filter cut-off wavelength throughout the range of second filter cut-off wavelengths, the cut-on wavelengths corresponding to second filter cut-off wavelengths at the lower end of the range being below the visible light wavelength range.

13. A color cross-fading system as claimed in claim 12 in which the ratio of the second filter cut-off wavelength to the cut-on wavelength is in the range of from 1:0.40 to 1:0.50.

14. A color cross-fading system as claimed in claim 13 in which said ratio of the second filter cut-off wavelength to the cut-on wavelength is 1:0.45.

15. A color cross-fading system as claimed in claim 1 in which each filter element is in the form of a disk, the gradient axis being a circular line on said disk.

16. A color cross-fading system as claimed in claim 15 in which a sector of each disk is left uncoated.

17. A color cross-fading system as claimed in claim 1 in which each filter element is in the shape of an elongated strip, and said gradient axis is a straight line on said strip.

18. A color cross-fading system as in claim 1 wherein said mounting means further comprises motor means for moving the gradient axis of each said filter elements relative to the optical axis.

19. A color cross-fading system as in claim 1 wherein said layers of materials include layers of silicon dioxide alternating with layers of titanium dioxide.

20. A color cross-fading system as in claim 1 wherein said filters are of materials which have limited blocking bandwidths.

21. A complex color producing system which changes spectral composition of a light beam, comprising:
a first filter element formed of a plurality of layers of materials having different refractive indices and formed to have a long wave pass characteristic along a first predetermined axis thereof which varies continually along said first axis proportional to a total thickness of said layers of materials, and such that a long wave pass characteristic at a first point on said first axis is different than the long wave pass characteristic at a second point on said first axis, said first filter element being positioned in an optical path of said light beam and movable within said optical path to allow a desired long wave pass characteristic; and
a second filter element, optically in series with said first filter element, and having a short wave pass characteristic along a predetermined second axis thereof which varies continually along said second axis, proportional to a total thickness of said layers of materials, and such that a short wave pass characteristic at a first point on said second axis is different than the short wave pass characteristic at a second point on said second axis, said first filter element being positioned in the optical path of said light beam and movable within said optical path to allow a desired short wave pass characteristic;
whereby light of a desired color can be obtained by selectively moving said first and second filter elements to different points along said first and second predetermined axis.

22. A system as in claim 21 wherein said first filter element is optically upstream of said second filter element.

23. A system as in claim 21 wherein said second filter element is optically upstream of said first filter element.

24. A system as in claim 21 wherein said first and second filter elements are disk-shaped elements, and said predetermined axes are a circular axes on said disk-shaped elements.

25. A system as in claim 21 in which said first and second filter elements are rectangular elements and said predetermined axes are straight axes on said elements.

26. A method of providing a complex color from an input light beam comprising the steps of:
providing a first filter element with a varying thickness and having a long wave pass, characteristic which varies along a first predetermined axis thereof proportional to said thickness in a way such that its characteristic at any one point along the first predetermined axis is different than a characteristic at any other point along the first predetermined axis;
providing a second filter element with a varying thickness, optically in series with said first filter element, and having a short wave pass characteristic which varies along a second predetermined axis thereof proportional to said thickness in a way such that its characteristic at any one point along the second predetermined axis is different than a characteristic at any other point along the second predetermined axis;
projecting a beam of multi-spectrum light along an optical axis;

positioning said first and second filter elements such that a first selected portion of said first predetermined axis is along said optical axis and a second selected portion of said second predetermined axis is along said optical axis; and adjusting positions of said first and second filter elements to obtain a desired output color.

27. A system as in claim 1, wherein said continuous varying of said first and second cut-off wavelengths of said first and second filter elements, respectively, is such that at any one point along said gradient axis, said cut-off wavelength is different than it is at any other one point along said gradient axis.

28. A system as in claim 21, wherein at any one point along said first predetermined axis, said long wave pass characteristic is different than at any other point along said first axis, and said short wave pass characteristic of said second filter element is such that at any one point along said second axis, said short wave pass characteristic is different than a short wave pass characteristic at any other point along said second axis.

29. A color cross-fading system as in claim 21 wherein said first and second filter elements collectively have an area which produces colors of the magenta hue by transmitting red and blue regions of the spectrum while blocking the green region.

* * * * *

Adverse Decision In Interference

Patent No. 5,426,576, William E. Hewlett, COLOUR CROSS-FADING SYSTEM FOR A LUMINAIRE, Interference No. 104,555, final judgment adverse to the patentee rendered April 18, 2002, as to claims 1-4, 7, 8, 11, 12, 15, 16, 18, 20-24, and 26-28.

*(Official Gazette May 28, 2002)*